US010791464B2

(12) United States Patent
Soliman et al.

(10) Patent No.: US 10,791,464 B2
(45) Date of Patent: Sep. 29, 2020

(54) METHOD FOR ESTABLISHING A SECURE CONNECTION

(71) Applicant: Athonet S.r.l., Trieste (IT)

(72) Inventors: Hesham Soliman, South Melbourne (AU); Carlo Carraro, Costabissara (IT); Gianluca Verin, Pozzoleone (IT)

(73) Assignee: ATHONET S.R.L., Trieste (IT)

( * ) Notice: Subject to any disclaimer, the term of this patent is extended or adjusted under 35 U.S.C. 154(b) by 0 days.

(21) Appl. No.: 16/566,371

(22) Filed: Sep. 10, 2019

(65) Prior Publication Data

US 2020/0084633 A1    Mar. 12, 2020

Related U.S. Application Data

(60) Provisional application No. 62/729,052, filed on Sep. 10, 2018.

(51) Int. Cl.
| | |
|---|---|
| *H04W 12/08* | (2009.01) |
| *H04W 12/00* | (2009.01) |
| *H04W 12/06* | (2009.01) |
| *H04W 8/18* | (2009.01) |
| *H04L 29/06* | (2006.01) |

(52) U.S. Cl.
CPC ..... *H04W 12/0804* (2019.01); *H04L 63/0876* (2013.01); *H04L 63/10* (2013.01); *H04W 8/18* (2013.01); *H04W 12/001* (2019.01); *H04W 12/0051* (2019.01); *H04W 12/0608* (2019.01)

(58) Field of Classification Search
CPC ......... H04W 12/0804; H04W 12/0051; H04W 12/001; H04W 12/0608; H04W 8/18; H04L 63/10; H04L 63/0876
USPC ...................................................... 455/411
See application file for complete search history.

(56) References Cited

U.S. PATENT DOCUMENTS

| | | | |
|---|---|---|---|
| 2013/0298209 A1* | 11/2013 | Targali | H04L 63/0815 726/6 |
| 2015/0189554 A1* | 7/2015 | Rahman | H04W 36/0055 455/438 |
| 2016/0212695 A1* | 7/2016 | Lynch | H04W 48/06 |
| 2017/0272996 A1* | 9/2017 | Perras | H04W 36/22 |
| 2019/0044933 A1* | 2/2019 | de Andrade | H04L 63/08 |

* cited by examiner

*Primary Examiner* — Inder P Mehra
(74) *Attorney, Agent, or Firm* — Volpe and Koenig, P.C.

(57) ABSTRACT

A method for creating a secure communication session between a user and an application server is provided. The method includes: providing a database associating a plurality of authorized user identifiers with a plurality of security credentials approved by the application server; assigning an IP address to the user; providing the serving gateway with the IP address and the user identifier of the user connected to the core network; checking whether the user identifier of the connected user to the core network is present in the database among the authorized user identifiers; forming a secure connection between the application server and the serving gateway using the security credential associated to the authorized user identifier of the user connected to the core network; and forwarding all packets from the application network addressed to the user via the secure connection to the user and vice versa.

9 Claims, 8 Drawing Sheets

METHOD FOR ESTABLISHING A SECURE CONNECTION

CROSS REFERENCE TO RELATED APPLICATION

This application claims the benefit of U.S. Provisional Application No. 62/729,052, filed Sep. 10, 2018, which is incorporated by reference as if fully set forth.

FIELD OF INVENTION

The present invention generally relates to a method of creating a secure communication session between a user and an application server.

BACKGROUND

IOT is an acronym for Internet of Things and it refers to the explosion of devices low power or not that are connected to the Internet in order to report exchange information, report almost real-time sensors position, aggregate data and gain insights from myriads of devices dispersed or located in particular region or geography which may send an unprecedented massive amount of messages that needs to be analyzed with helps of AI algorithms for a number of uses including mission critical. The IoT world allowing a large collection of sensors data will be responsible to send alerts before catastrophic but now predictable events, help to perform predictive maintenance, improve efficiency in taking decisions, managing logistics and assets.

For devices communicating to application servers in the Internet, traffic needs to be securely delivered to the application servers which can run in enterprises, data centers or the public cloud. A number of platform are now available on fully managed public clouds such Amazon AWS IoT, Google Cloud IoT and Microsoft Azure IoT.

However, the problem with the above approaches can be summarized as follows.

Many IoT devices are power-limited and not chargeable (e.g. sensors). Such devices are installed and never removed, until they run out of power, which in many cases is expected to take years. For those devices, having to perform encryption, or compute digital signatures, would be expensive power-wise and should be avoided.

Further, installing credentials on devices and renewing them adds another management and deployment challenge, which can potentially become expensive from a power point of view.

Moreover, generally, performing complex protocol operations, handling timeouts and redirects can reduce the idle time of an IoT device and therefore reduce their lifetime if they belong to the category of power-limited non-chargeable devices.

The above issues call on minimizing the amount of work that needs to be performed by the end device and adding more intelligence in the network to handle those cases. This might not be feasible in all scenarios. However, this invention addresses this issue within the context of a 4G and 5G mobile network.

SUMMARY

This invention relates to a Serving IoT Gateway (SIGW) for 4G and 5G mobile networks that can be included as an integral component of the core network. The SIGW works in transparent and explicit modes as described below. It acts on behalf of the IoT device to enable communication with a remote IoT application server in a secure manner, while eliminating the management and deployment complexities above. Furthermore, it eliminates the power consumption issues introduced by the use of cryptographic algorithms.

The SIGW terminates the connection from the IoT device connected to the mobile network and re-initiates it to the IoT application server. In doing that, it secures the connection to the application server and utilizes the mobile network security over the radio interface and the core network. Hence, while the connection is not secure end to end, it provides an adequate security alternative.

Any device connected to the mobile network is configured with a profile in the Home Subscriber Services (HSS) function. The SIGW learns the profile of a connected device and from that knowledge, it knows what this device is authorized to do and which IoT application servers it may communicate with. Furthermore, this invention introduces the idea of adding a unique security credential (e.g. a digital certificate) in the profile, for each IoT device. The credential, hereafter referred to as the "certificate" for simplicity, may be issued by the IoT service provider or any other issuer recognized by that service provider. The certificate and relevant profile data are retrieved by the SIGW to secure the connection between itself and the IoT application server, while uniquely identifying the device to the IoT application server. The SIGW optionally adds an additional protocol layer such as MQTT, AMQP, HTTP, COAP or other messages protocols typical of the public IoT cloud applications and uses it on top of a secure transport, typically TLS/SSL.

The SIGW works in semi-transparent, transparent or explicit mode. This relates to the discoverability of the SIGW. Note that these modes can co-exist within the same SIGW device. That is, it can act in multiple modes for different IoT devices. In transparent mode, the SIGW intercepts traffic originated from known IoT devices and terminates the connection, then re-initiates it to the IoT application server. This is a similar function to the Network Address Translator (NAT). The SIGW maintains a mapping between the original device's IP address and port number to the address and port number it assigns to the connection to the IoT application server.

In explicit mode, the SIGW acts as a visible proxy to the IoT device. The SIGW may be discovered in one of several ways.

Using the DNS, the IoT device can lookup the IP address of the SIGW by looking for a specific "well known" domain name. E.g. SIGW.MNC.org where MNC is the mobile network code in the SIM card. Other well-known domains may be reserved for this purpose.

DHCP can be extended with a configuration parameter for the SIGW. This can be done for either DHCP or DHCPv6 to support IPv6 devices.

The SIGW IP addresses can be sent as extra parameters during the IoT device's Attach message sequence with the core network.

The IPv6 router advertisement message could be extended with a new option that carries the IP addresses of the SIGW.

Once in explicit mode, the IoT device can communicate directly with the SIGW, which eliminates the need for the SIGW to perform a NAT function.

In semi-transparent mode, the PGW (or UPF in 5G networks) can create a specific VRF for the IoT devices' APN, which, based on the device's profile, can tunnel the IoT device's packets directly to the SIGW. This mode is semi-transparent because the IoT device is not aware of this function occurring in the network, while the SIGW does not need to intercept packets coming out of the core network as it explicitly receives the packets destined to its own addresses.

In semi-transparent mode, the PGW (or UPF) can tunnel the packets in IP, or in an upper layer protocol, e.g. HTTP.

The knowledge of which devices are IoT devices and their corresponding credentials is discovered by the SIGW in one of several ways. In one embodiment of this invention, the SIGW is configured with a list of IMSI's, or IMEIs (or hardware identifiers), or user names (with associated passwords) pre-provisioned in the devices, which uniquely identifies the IoT device. The SIGW can then query the PGW (or UPF) to determine the corresponding IP address for a given IMSI. This query can be done using existing protocols. For instance, the existing RADIUS accounting request and accounting response messages.

In another embodiment of this invention, the SIGW is provisioned with a list of authorized IoT devices, associated with a device identifier (Dev-ID) assigned and/or known by the IoT application that is meant to communicate with said devices. In order to associate said Dev-ID to a real IoT device, and consequently to the credentials used to establish the secure communication between said device and the application, different methods can be used, including: i) a provisioning graphical user interface (GUI) exposed by the SIGW to a human operator, for instance a web portal, ii) a configuration file uploaded onto the SIGW, iii) an Application Programming Interface (API) exposed by the SIGW and used by either the aforementioned IoT Application or another one.

It is assumed an IoT Service administrator has access to an IoT Service platform, either owned by the administrator itself or from a third party, to which both the IoT devices and the IoT application are meant to connect, in order to establish the communication. It is also assumed that the IoT Service administrator has knowledge of the Dev-IDs to be used for each IoT device that belongs to the IoT Service. The provisioning method above shall allow to input into the SIGW, for each intended IoT device, the corresponding Dev-ID, along with at least one or a combination of the following parameters: the IoT device's IMEI, the IMSI associated to the SIM card used by the IoT Device and the Integrated Circuit Card ID (ICCID) of said SIM card. Optionally, the credentials/certificate to be used to secure the communication can be inputted as well. Depending on the parameters used as input to the provisioning system, different procedures apply.

BRIEF DESCRIPTION OF DRAWINGS

The invention will be better detailed with reference to the appended drawings, where.

DETAILED DESCRIPTION OF THE PREFERRED EMBODIMENTS

Acronyms

API: Application Programming Interface
EPC: Evolved Packet Core
HSS: Home Subscriber Service
IoT: Internet of Things
LTE: Long Term Evolution
MNO: Mobile Network Operator
P-GW: Packet Data Network Gateway
QoS: Quality of Service
RAN: Radio Access Network
SMF: Session Management Function (5G nomenclature)
UPF: User Plane Function (5G nomenclature)

Figure 1:
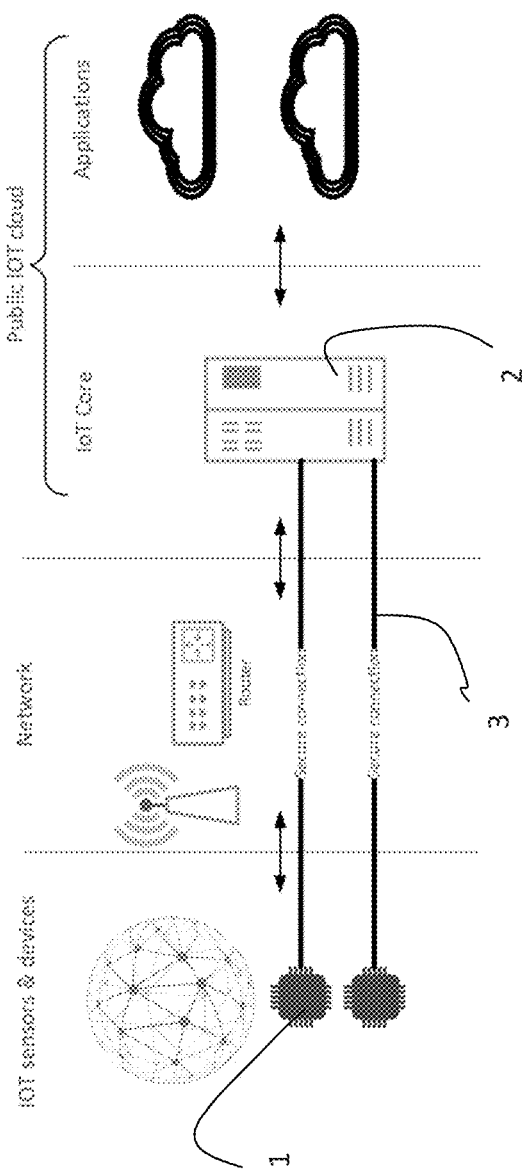
FIG. 1 is a schematic drawing of a prior art IOT communication to standard Public IOT Cloud.

FIG. 1 shows a secure connection 3 formed between an user 1 (IoT sensors and devices) and a server 2 according to the prior art.

Figure 2:
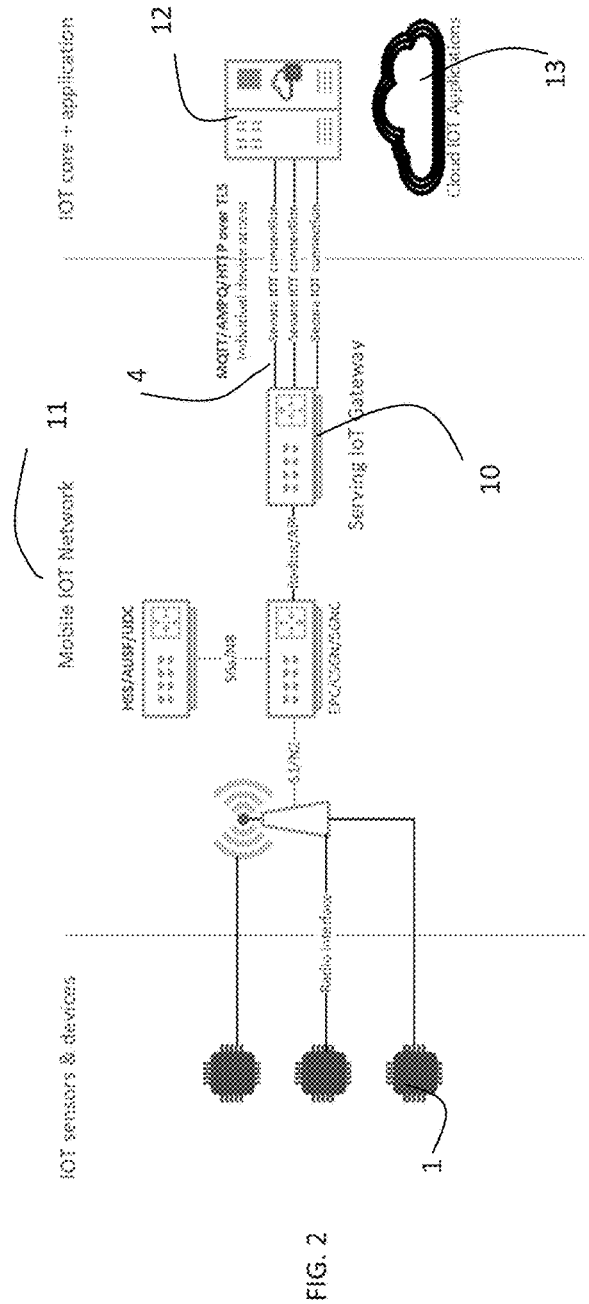
FIG. 2 is a schematic drawing of a serving IoT gateway (SIGW) connecting 4G/5G mobile networks to the IoT Core and application clouds according to the invention.

FIG. 2 shows a serving IoT gateway (SIGW) 10 connecting 4G/5G mobile networks 11 to the IoT Core 12 and application clouds 13. The SIGW 10 is responsible of establishing the secure connections 4 towards the Core IoT 12 and relieves the users 1 from the task of establishing a secure (such as TLS) connection using a certificate which may not be possible for low cost, low power, simple stack devices like the one used for sensors. A single Secure TLS connection 4 from the SIGW 10 to the IOT Core 12 can optionally be used to map the traffic flow of multiple devices.

Figure 3:
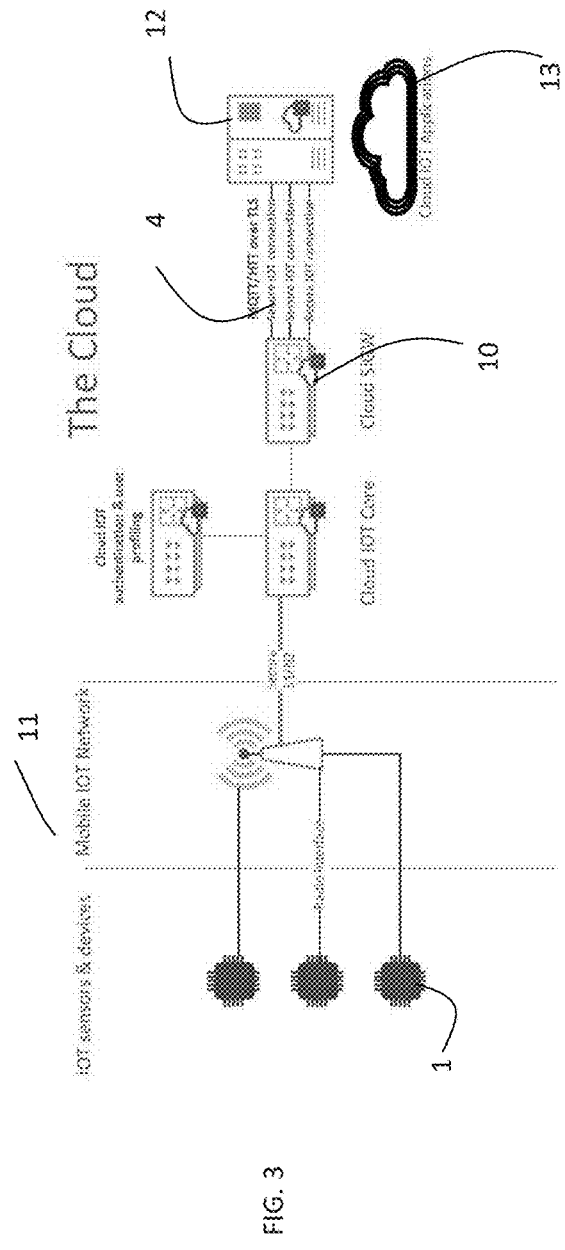
FIG. 3 is a different embodiment of the serving IoT gateway (SIGW) connecting 4G/5G mobile networks to the IoT Core and application clouds according to the invention.

FIG. 3 shows a mobile IoT implementation in the Cloud. This figure is an alternative implementation of what is shown in FIG. 2, where everything is in the cloud.

Figure 4:
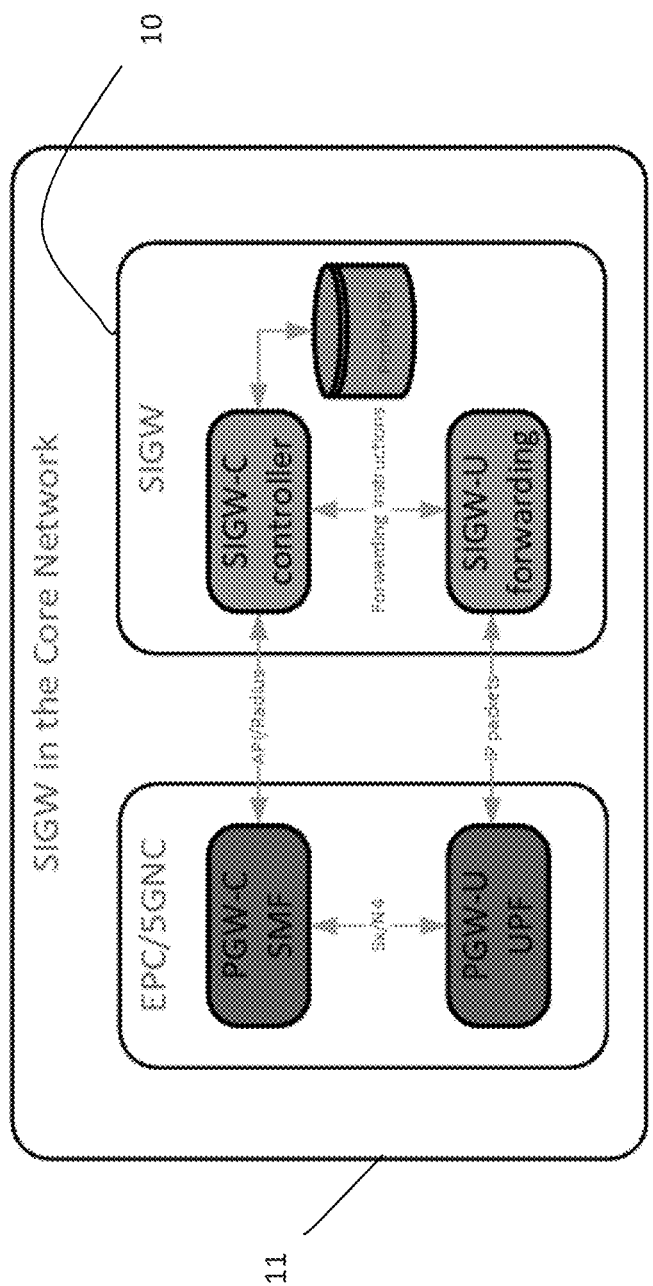
FIG. 4 is a further different embodiment of the serving IoT gateway (SIGW) according to the invention.

FIG. 4 shows another possible implementation where the SIGW 10 is optionally embedded into the PGW of the core network 11; or broken into SIGW controller and forwarding and the SIGW-C is implemented into the PGW-C or SMF and the SIGW-U is implemented into the PGW-U or UPF.

Figure 10:
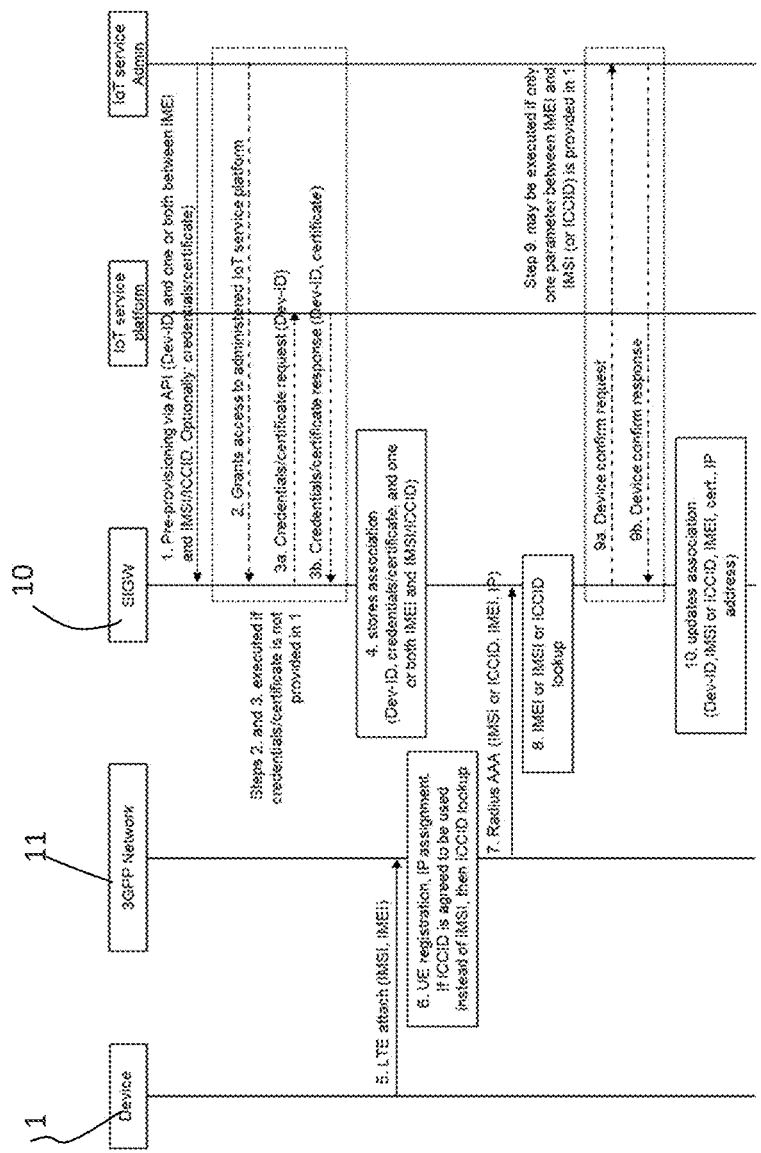
FIG. 10 shows some of the steps of the method of the invention.

The above architecture function according to the method of the invention depicted in FIG. 10. In this picture the user 1 is called device. The network 11 is a 3GPP network. The phases of the method are depicted in FIG. 1 and described below (the numbers of the phases refer to the corresponding numbers in the FIG. 10):

1. The IoT Service administrator uses the SIGW's provisioning tool (e.g., the API-based one) to input a Dev-ID, and either one or both between the IMEI and the IMSI. The 3GPP network operator and the SIGW administrator (which can be the same entity) can agree to use the SIM card's ICCID instead of the IMSI. If the device's credentials (e.g. a X.509 certificate) are inputted as well, then skip to step 4.

2. The IoT Service administrator grants the SIGW access to the IoT Service Platform. The method used for this operation is out of scope of the present invention. This step can be skipped if the IoT Application fetches the device's credentials and passes them on to the SIGW (note that only the IoT Service Platform's URI needs to be known to the SIGW, in order for the system to work properly).

3. The SIGW requests the creation of the device's credentials (e.g. a X.509 certificate) to the IoT Service platform and fetches them. This step can be skipped if the IoT Application fetches the device's credentials and passes them on to the SIGW.

4. The SIGW stores the association between the Dev-ID, the credentials and the device-identifying parameters conveyed in step 1.

5. Upon network attach, the IoT device sends its IMSI and IMEI pair to the mobile network functions as part of the 3GPP standard network procedures.

6. The 3GPP network triggers the necessary procedures for registering the device in the network, and eventually assigns an IP address to it. If the system devises the use of the ICCID parameter, then an ICCID lookup is performed based on the information sent by the device during the attach procedure. The details of the ICCID lookup procedure are out of the scope of the present invention.

7. The 3GPP network sends the IP address along with the IoT device's IMEI and IMSI to the SIGW. The ICCID is passed instead of the IMSI if the 3GPP network and the SIGW are configured so.

8. The SIGW checks that the received IMEI and/or IMSI (ICCID) is (are) registered in its database as a result of step 1. If both IMEI and IMSI (ICCID) are present, then the procedure skips to step 10. If one parameter only is stored, either the IMEI or the IMSI (ICCID), then the additional step 9 may be optionally executed. If no parameter is present, the IoT device registration is rejected.

9. The SIGW requests the IoT Service administrator to validate the IoT Device's registration. This can be achieved by sending an explicit request message to an IoT Service administrator-owned application, or by requesting the IoT Service administrator to press a "confirm button" on the GUI-based provisioning portal.

10. The SIGW finalizes the IoT device registration, storing the Dev-ID, the IMEI, the IMSI (ICCID), the credentials/certificate and the IP address associated to the device.

From the procedure above, an IoT application can manage an IoT device identified by its Dev-ID, and the SIGW can forward the traffic to/from an IoT device to/from the IoT application, making sure that the IoT application can distinguish the IoT device associated to given traffic flows.

In another embodiment of this invention, the SGW can query the HSS for a list of IMSI's for IoT devices. The key of such query can be a predefined field in the profile provisioned for a given subscriber. The SIGW can use the same messages to the PGW/UPF to retrieve the corresponding IP addresses.

In another embodiment of this invention, the SIGW can be incorporated as part of the PGW/UPF function, which enables it to avoid sending any messages for retrieval of IP addresses, which are locally known.

The SIGW may also be configured either manually or through the retrieval of the HSS profile, of a given IoT application server destination address for an IoT device. This allows the SIGW to implement forwarding policies for IoT devices that do not have IP connectivity. For instance, an IoT device using the NB-IoT standard may be sending non-IP data which is transported directly over the radio interface signaling. Such data can be sent directly to the SIGW, while incorporating the device identifier or the IMSI. The SIGW uses this information to construct an IP packet and send it to the appropriate IoT application server.

Figure 5:
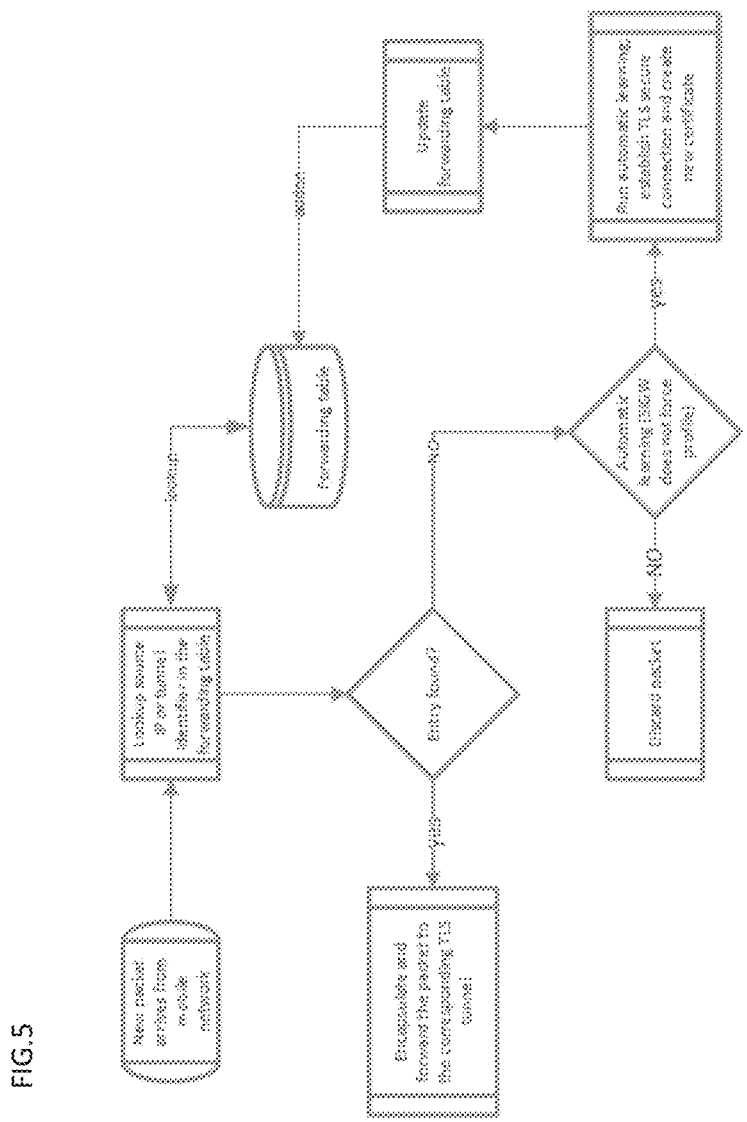
FIG. 5 is a diagram showing SIGW packet forwarding from user (device) to IoT application.

FIG. 5 shows SIGW packet forwarding from device 1 to IoT application.

As part of the invention also the automatic learning mechanism that allows to open a TLS tunnel certificate based unique for each IoT device, although the association user identity/certificate has not been pre-provisioned in the SIGW database or external databases such as SPR or HSS database. The packet when forwarded to the application server is encapsulated in MQTT or HTTP or other protocols over a secure protocol (e.g. TLS).

Figure 6:
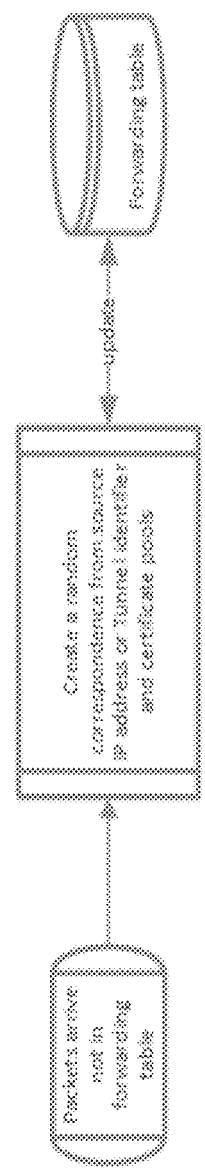
FIG. 6 is a diagram showing a step of the method of the invention.

SIGW may enable an automatic learning mechanism which acts just like a NAT and maps unique IP addresses or Tunnel id belonging to different devices to different and unique certificates. The correspondence, when the automatic learning is used, is valid as long as the IP address or tunnel id does not change. In this case the user identity verification is left to the application. This is shown in FIG. 6.

Figure 7:
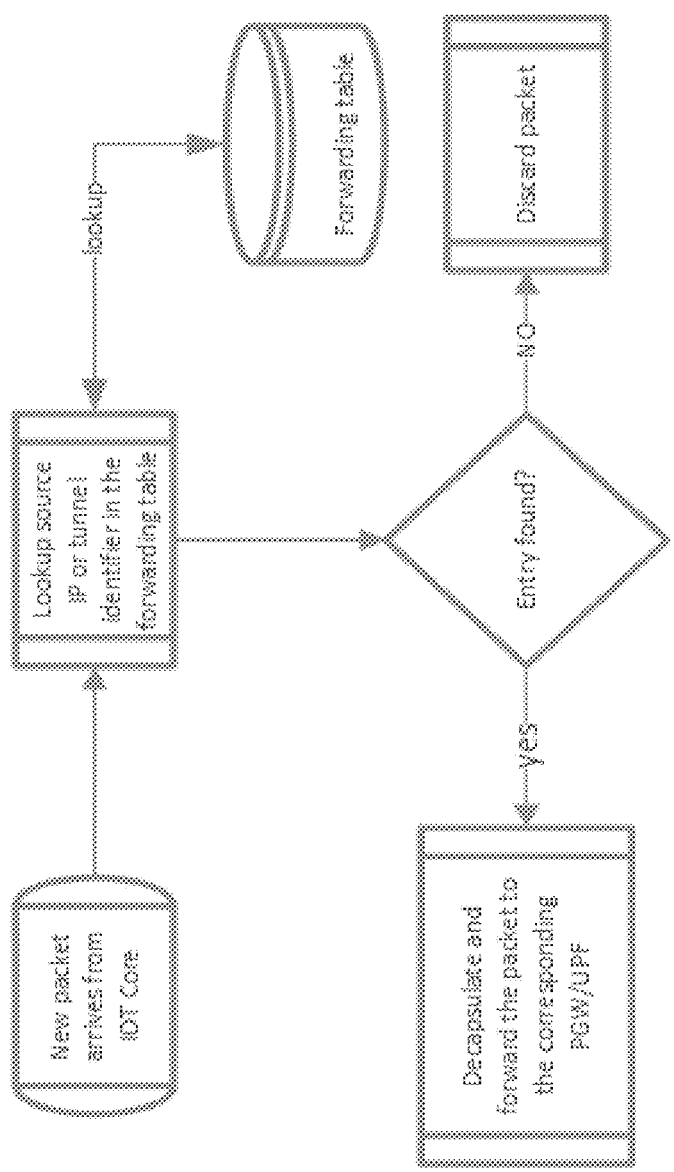
FIG. 7 is a diagram showing SIGW packet forwarding from IoT application to the device.

The packet forwarding by the SIGW 10 is better detailed in FIG. 7, where SIGW packet forwarding from IoT application to the device 1 is shown. The TLS tunnel is terminated, packet de-capsulated and forwarded to the PGW or UPF.

Figure 8:
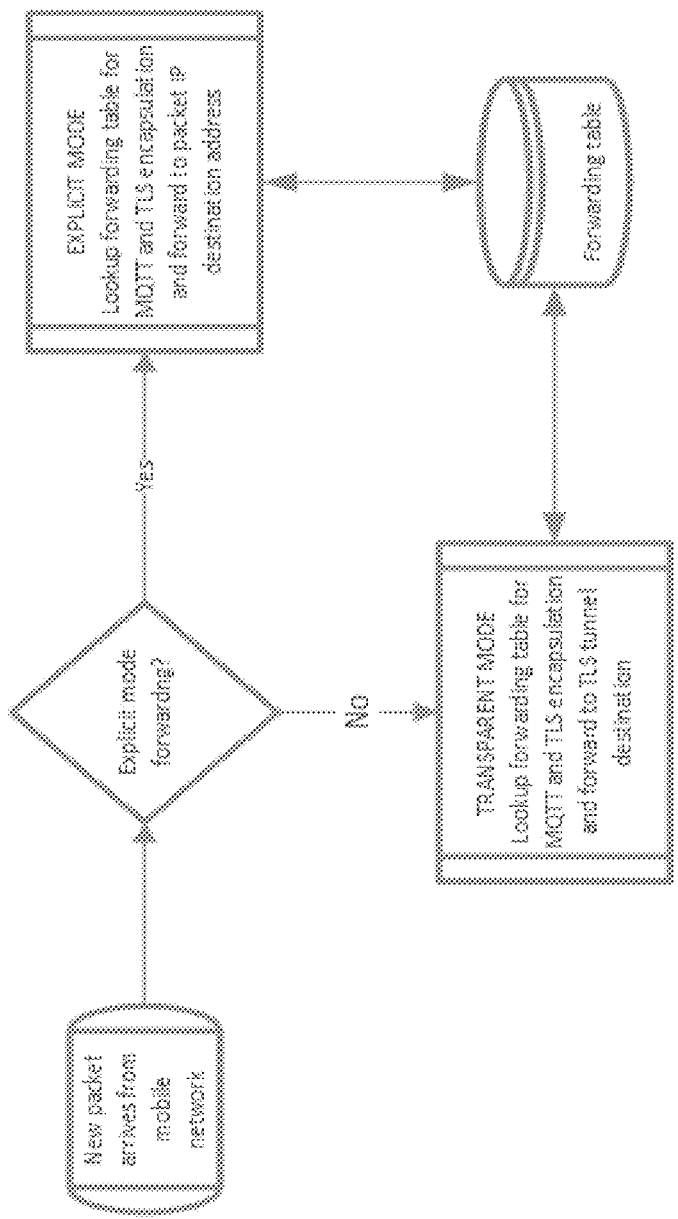
FIG. 8 is a diagram showing a different embodiment of the packet forwarding of FIG. 7.

FIG. 8 shows a different forwarding mode.

Figure 9:
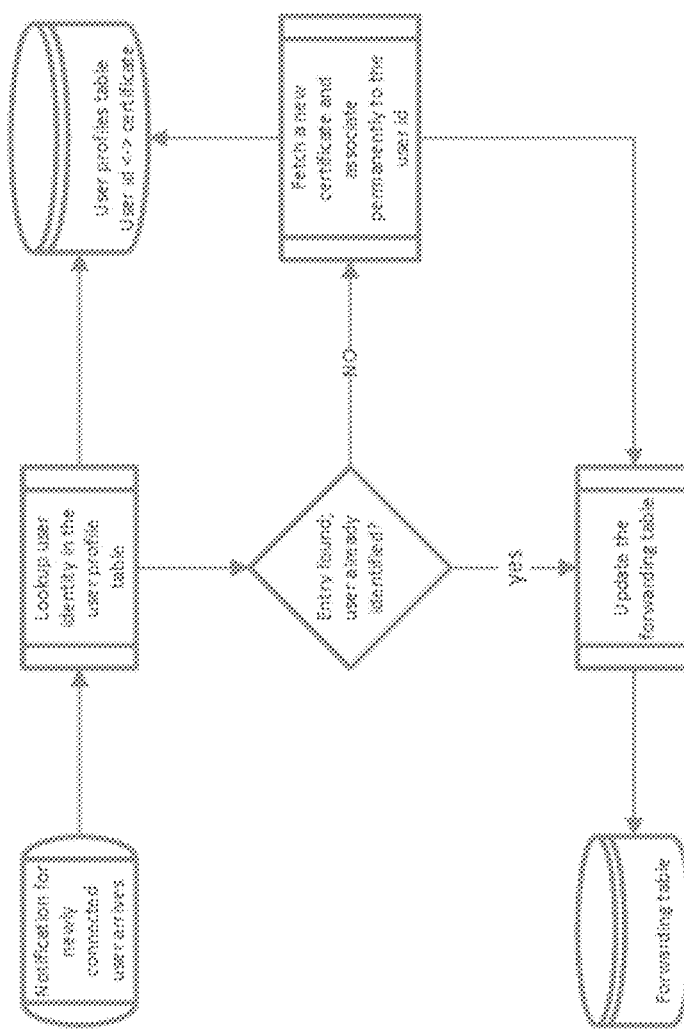
FIG. 9 is a diagram showing another step of the method of the invention.

FIG. 9 shows the phases of the method when another device (user 1) is associated. SIGW 10 populates the forwarding table and associates the user identity with certificates. The certificates may be pre-defined in the user profiles (HSS) or provisioned internally into the SIGW. The policy is contained in the user profile which associate to a user a certificates validated with the IoT Core platform. At the end of the process, the forwarding table is always updated. The notification of a newly connected users and its association with tunnel identifier or IP address may be provided in several mode such as the Radius accounting messages largely available in the PGW and/or SMF 5G equivalent.

The invention claimed is:

1. A method for creating a secure communication session between a user identified by a user identifier and an application server via a core network and a IP network external to said core network, said user accessing said core network via a radio access network, the method comprising:
   a. providing a serving gateway;
   b. providing a database associating a plurality of authorized user identifiers with a plurality of security credentials approved by the application server, wherein the plurality of authorized user identifiers at least includes international mobile subscriber identities (IMSIs);
   c. assigning, when said user connects to said core network, an IP address to the user;
   d. providing the serving gateway with the IP address and the user identifier of the user connected to the core network, the user requesting a communication session with the application server;
   e. checking whether the user identifier of the connected user to the core network is present in the database among the authorized user identifiers;
   f. if the user identifier of the connected user to the network is present in the database, forming a secure connection between the application server and the serving gateway using the security credential associated to the authorized user identifier of the user connected to the core network;
   g. forwarding, by the serving gateway, all packets from the application network addressed to the user via the secure connection to the user and vice versa.

2. The method according to claim 1, wherein the secure connection is a transport layer security (TLS) connection.

3. The method according to claim 1, wherein the serving gateway includes a forwarding table for the forwarding of packets from the user to the application network and vice versa.

4. The method according to claim 1, wherein the user identifier is at least one of:
   the user's international mobile subscriber identity (IMEI),
   the international mobile subscriber identity (IMSI) associated to the SIM card used by the user, or
   the Integrated Circuit Card ID (ICCID) of said SIM card.

5. The method according to claim 1, wherein the step of providing a database including the authorized user identifiers includes:
   storing the database in the serving gateway;
   querying the Home Subscriber Server (HSS) of the network for the list of authorized user identifiers.

6. The method according to claim 1, further including:
   providing in the database a list of application server accessible for each authorized user identifier; and
   forming a secure connection between the serving gateway and the application server only if the user requesting the connection is authorized to access the application server according to the database.

7. The method according to claim 1, wherein the plurality of authorized user identifiers only includes the international mobile subscriber identities (IMSIs).

8. The method according to claim 1, wherein the plurality of authorized user identifiers also includes international mobile equipment identities (IMEIs).

9. A method for creating a secure communication session between a user identified by a user identifier and an application server via a core network and a IP network external to said core network, said user accessing said core network via a radio access network, the method comprising:

a. providing a serving gateway;
b. providing a database associating a plurality of authorized user identifiers with a plurality of security credentials approved by the application server;
c. assigning, when said user connects to said core network, an IP address to the user;
d. providing the serving gateway with the IP address and the user identifier of the user connected to the core network, the user requesting a communication session with the application server;
e. checking whether the user identifier of the connected user to the core network is present in the database among the authorized user identifiers;
f. if the user identifier of the connected user to the network is present in the database, forming a secure connection between the application server and the serving gateway using the security credential associated to the authorized user identifier of the user connected to the core network;
g. forwarding, by the serving gateway, all packets from the application network addressed to the user via the secure connection to the user and vice versa, and
if the user identifier of the connected user is not present in the database, associating to the user identifier a preliminary security credential not associated with any other user identifier;
creating a secure connection to the application server using the preliminary security credential;
authenticating the user identifier at the application server;
if the application server authenticate the user identifier, updating the database with the authenticated user identifier and the preliminary security credential.

\* \* \* \* \*